United States Patent [19]

Nishiura et al.

[11] Patent Number: 4,658,132
[45] Date of Patent: Apr. 14, 1987

[54] ROTATIONAL ANGLE DETECTING DEVICE WITH FULL CIRCUMFERENCE ILLUMINATION AND DETECTION

[75] Inventors: Masaharu Nishiura; Hakubun Fujisawa; Katsumi Yamada, all of Kanagawa, Japan

[73] Assignees: Fuji Electric Co., Ltd.; Fuji Electric Corporate Res. & Dev. Ltd., both of Kanagawa, Japan

[21] Appl. No.: 643,717

[22] Filed: Aug. 24, 1984

[30] Foreign Application Priority Data

Aug. 26, 1983 [JP] Japan .................................. 58-156027

[51] Int. Cl.4 ............................................. G01D 5/34
[52] U.S. Cl. ........................... 250/231 SE; 250/237 G
[58] Field of Search ..................... 250/231 SE, 237 G; 356/395; 340/347 P

[56] References Cited

U.S. PATENT DOCUMENTS 3,549,897 12/1970 Blake .............................. 250/231 SE
3,757,128 9/1973 Vermeulen ....................... 250/237 G
4,086,488 4/1978 Hill .................................. 250/231 SE
4,334,222 6/1982 Kelley et al. .................... 250/231 SE
4,496,835 1/1985 Boella et al. ...................... 340/347 P Primary Examiner—David C. Nelms
Attorney, Agent, or Firm—Finnegan, Henderson, Farabow, Garrett and Dunner

[57] ABSTRACT

A rotational angle detecting device includes a rotatable plate attached to a shaft of a rotatable motor having a plurality of windows located at a first angular pitch and at a selected circumference with respect to the shaft, a light source, a stationary plate including first and second photoelectric detecting elements at a second pitch and the selected circumference, and electrical conductors connecting the first detecting elements in parallel and the second detecting elements in parallel such that the sum of the electrical signals produced by the photoelectric detecting elements are used to generate digital signals describing the rotational movement of the shaft with respect to the stationary plate.

14 Claims, 20 Drawing Figures

ROTATIONAL ANGLE DETECTING DEVICE WITH FULL CIRCUMFERENCE ILLUMINATION AND DETECTION

CROSS REFERENCE TO RELATED APPLICATION

This application is related to subject matter disclosed in copending patent application Ser. No. 643,719 filed Aug. 24, 1984, entitled Rotational Angle Detecting Device.

FIELD OF THE INVENTION

The present invention relates to a device for detecting rotational angle, rotational position, and rotating speed of rotors and the like.

BACKGROUND OF THE INVENTION

A rotary encoder, a rotary pulse generator, and the like are known as devices for measuring rotational angles, rotational positions, and the rotating speed of rotors.

A rotary encoder converts an analog measurement of rotational angle to a corresponding digital value by generating pulse signals with frequencies and amplitudes proportional to the analog measurement. The pulse signals can be used to measure a length along which a plate of stainless steel is cut, to detect a displacement of an arm or body of a robot, to choose tools for a machining center through a measurement of rotational angles, etc. The pulse signals also can be used to detect the speed of cars and the engines thereof, to control rotational angles of dc-motors which are used in tape recorders, facsimile machines, printers, and the like. Rotary pulse generators operate in the same manner as rotary encoders, and are preferably used for detecting the rotational angle of low speed rotors.

Figure 1:
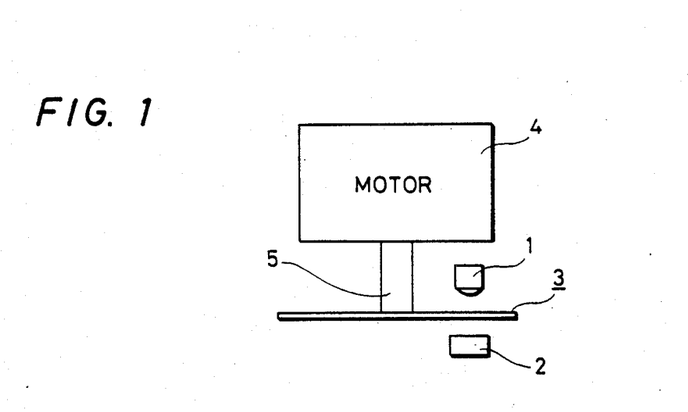
FIG. 1 is a schematic illustration of a conventional rotational angle detecting device.

A general scheme of a conventional rotational angle detecting device is shown in FIG. 1. Reference numeral 4 designates a motor the rotational angle of which is to be detected. A rotating disk 3 is attached to a shaft 5 of the motor 4.

Figure 2:
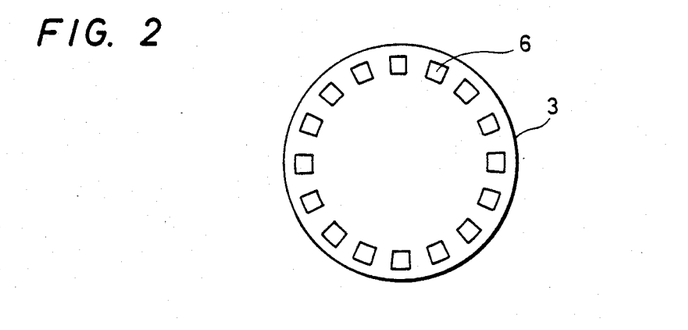
FIG. 2 is a top view of a rotating disk 3 of the device of FIG. 1.

A top view of the rotating disk 3 is shown in FIG. 2. Photowindows 6 are formed to have a constant pitch along a circumferential direction and to allow light to pass through them. A light source 1, such as a light emission diode, and a photodetector 2, such as a photodiode, are opposed to each other. The rotating disk 3 is placed therebetween.

Figures 3A, 3B:
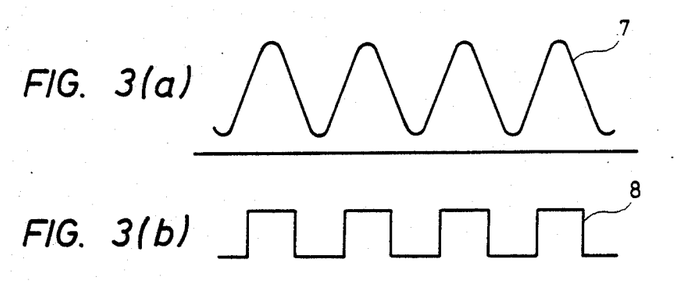
FIGS. 3(a) and 3(b) are diagrams of waveforms produced by a photodetector of the device of FIG. 1.

The light passing through the photowindows 6 reaches the photodetector 2 intermittently as the disk 3 rotates. Consequently, the photodetector 2 generates an output current 7 having a sinusoidal waveform as shown in FIG. 3(a). The current 7 is shaped to be a pulse train 8 as shown in FIG. 3(b) through a device such as a Schmitt trigger circuit (not shown in the figure). The pulse train can be used for operation and control.

If the number of the photowindows 6 is No, the number of rotations after the start of the motor 4 is m, and the number of pulses generated in this period is N, the following relation is obtained;

$$N/No = m + (N - mNo)/No \qquad (1)$$

The value of $360 \times (N - mNo)$ designates an angular difference between a reference point of the motor 4 and that of the stationary plate for counting the number of rotations of the motor 4. Therefore, the accuracy for measuring the angular difference is expected to be 360/N and it is necessary to make No as large as possible in order to improve the accuracy of the device.

As for the sensitivities of the photodiodes and the solar batteries conventionally used as the photodetector 2, an output current density of only about 10–20 uA/cm$^2$ is obtained under the illuminance of 100 lux, while an output current of at least 1 microamperes is required to achieve ready display and control at a low cost. Therefore, a lower limit for the size of the photowindows 6 exists from a viewpoint of utility.

If an evaluation is carried out by assuming that conventionally available photoreceivers are used from a viewpoint of utility, areas of 3 mm × 3 mm are required to obtain an output current of about 1 microamperes. Accordingly, for a rotating disk with a diameter of about 40 mm, at least fifteen photowindows are required. In this case the measuring accuracy of the angular difference is 24 degrees.

When an output current of 1 microamperes is obtained, it is usual that the output current would be converted to a voltage drop of about 10 millivolts through a resistance of about 10 KOhms, and be further amplified to about one hundred times larger through a conventional amplifier. For a conventional rotating disk which can generate 6000 pulses per revolution, the output current of the photodetector is 1 microamperes × 1/400 (=15/6000). Accordingly further amplification of the output current of 400 times is required. This high amplification causes distortions and makes it difficult to achieve stable amplification. Also, the amplifier circuit becomes more expensive.

Moreover, if the shaft 5 is attached to a point deviated from the center of the disk 3, the amount of light passing through the photowindows 6 will fluctuate. Pulsations will appear in the output current of FIG. 3(a) with a period equal to the cycle of rotations of the disk 3. The pulsations cause distortion of the waveform generated by the reforming circuit, which in turn degrades the accuracy of detection of the rotational angle.

The rotary disk 3 is usually constructed by making slits to be used as the photowindows, or by printing patterns of opaque material on a transparent glass disk such that the photowindows are located where the patterns do not exist. Irrespective of the processing methods, variations in the shapes, sizes, and positions of the photo windows cannot be avoided. The accuracy of detection of the rotational angle is adversely affected by the variations in the photowindows, since they cause distortions in the output current waveform from the photodetector. The phase and shape of individual pulses in the pulse train will fluctuate.

SUMMARY OF THE INVENTION

Accordingly, an object of the present invention is a rotational angle detecting device in which especially large amplification of the output current of the photodetector and the addition of a special circuit for stabilizing a large amplification circuit are not required.

Another object of the present invention is a rotational angle detecting device in which the detecting accuracy is not adversely affected by the deviation of the rotating disk from the stationary photodetecting plate and by fluctuations in the shapes, sizes, and positions of the photowindows.

A further object of the present invention is an inexpensive and accurate rotational angle detecting device.

The device of the present invention includes a rotatable plate which is adopted to be attached to a shaft of a rotor and has a plurality of photowindows arranged at a first angular pitch on at least a part of the circumference around the axis of the rotor. The device also includes at least one light source for illuminating at least two of the photowindows of the rotating plate at the same time. A stationary photodetecting plate, opposed to the rotating plate, has a plurality of photodetectors for receiving light passing through the photodetectors windows of the rotating plate. The plurality of photodetectors are arranged to have a second angular pitch on at least a part of the same circumference around the axis of the rotor. The second pitch is equal to the first pitch or is a fraction of the first pitch. The photodetectors are connected in parallel with respect to each other to generate an output signal comprising the sum of all electrical signals resulting from light passing through the photowindows and striking the photodetectors.

DESCRIPTION OF THE PREFERRED EMBODIMENTS

Figure 4:
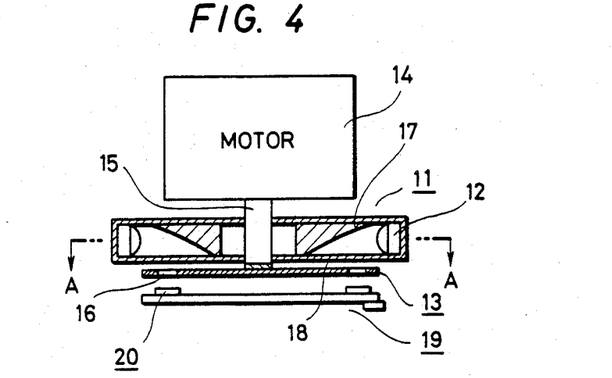
FIG. 4 a partial cross-sectional side view of a rotational angle detecting device according to a first preferred embodiment of the present invention.

FIG. 4 is a partial sectional side view of a rotation angle detecting device according to a first preferred embodiment of the present invention. A shaft 15 of a motor 14 of which the rotational angle is to be detected is attached to a rotating disk 13. A stationary photodetecting plate 19 is placed under the rotating disk 13. The plate 19 includes a photodetector 20 for receiving light passing through photowindows 16 in the rotating disk 13. A light source 11 includes at least one light emitter 12, such as a light emission diode, a light reflector 17, and a light diffusing plate 18.

Figure 5:
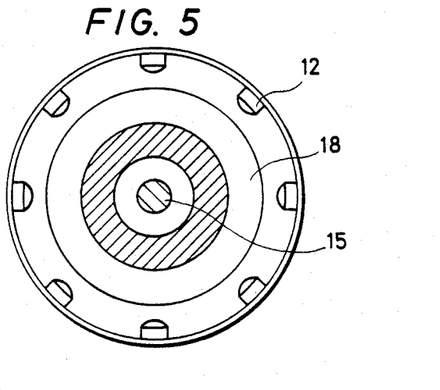
FIG. 5 is a cross-sectional view taken along a line A—A in FIG. 4.

FIG. 5 shows a cross-sectional view taken along a line A—A in FIG. 4 in which the arrangement of the light emitter 12 and the light diffusing plate 18 is shown. The number of light emitters 12 and the shape of the light reflector 17 are determined so as to illuminate the upper surface of the rotating disk 13 uniformly. The light diffusing plate 18 is used to improve the uniformity of the illumination.

Figure 6:
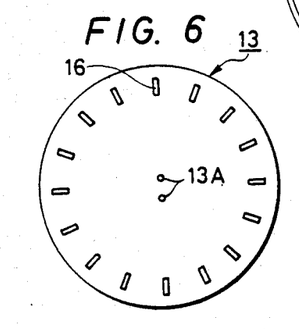
FIG. 6 is a top view of a rotating disk of the device of FIG. 4.

FIG. 6 shows a top view of the rotating disk 13. The rotating disk 13 is attached to the shaft 15 of the motor 14 by using holes 13A and appropriate attaching members not shown.

Figure 7:
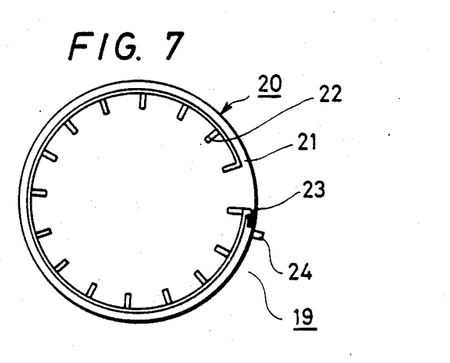
FIG. 7 is a top view of a stationary plate of the device of FIG. 4.

FIG. 7 shows a top view of the stationary photodetecting plate 19. A plurality of photodetectors 20, the number thereof being equal to the number of photowindows 16, are arranged on the stationary photodetecting plate 19 with constant pitch along the circumferential direction around the axis of the shaft 15. The photowindows 16 on the rotating disk 13 are made by conventional processes. For instance, they are made as slits formed in a thin metallic plate by selective etching. They can also be made by printing patterns of opaque material on a transparent glass disk to form the photowindows where the patterns do not exist.

Figure 8:
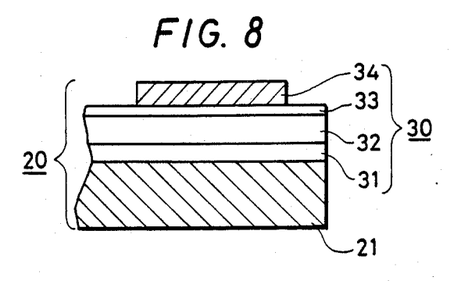
FIG. 8 is a fragmentary cross-sectional view of a photodetector of the device of FIG. 4.

FIG. 8 shows a fragmentary cross-sectional view of the photodetectors 20, which are made as follows. First, an amorphous silicon layer 30 is formed on the electrically conductive plate 21, such as a stainless steel plate. The layer 30 is formed by depositing a p-type layer 31 of a thickness of about 500 Å, a non-doped layer 32 of a thickness of about 0.5 $\mu$m, and a n-type layer 33 of a thickness of about 100 Å A by successive glow discharges. A transparent electrode 34 having the same radial pattern as that of the photowindows 16 on the rotating disk 13 is formed on the layer 30. The transparent electrode 34 is formed by vacuum deposition of a film of Indium-Tin oxide using conventional photoetching techniques.

Only a portion of the light passing through the transparent electrode 34 generates an electrical output signal. The remaining light illuminating the amorphous silicon layer 30 where the transparent electrode 34 does not exist cannot generate an electrical signal due to the high resistivity of the layer 30. A plurality of transparent electrodes 34, formed separately from each other, are connected in parallel by depositing a metal electrode 22 partially overlapping the transparent electrodes 34 as shown in FIG. 7. The metal electrode 22 is also connected to an output terminal 23. An electrode 24 is another output terminal.

The metal electrode 22 and the output terminal 23 may be constructed of the same material as the transparent electrode 34. It is preferably constructed, however, of opaque material to avoid the degradation of the S/N ratio due to a photo-voltage produced by it. The inner part of the amorphous silicon layer where the transparent electrodes 34 are not formed may be omitted because it does not produce electrical output.

In the construction mentioned above, all of the photowindows 16 are opposed to corresponding photodetectors 20 at the same time in every pitch along the circumferential direction, as the disk 13 rotates to cause the generation of a current in all the photodetectors 20.

The magnitude of the voltage decreases as the photowindows 16 move away from alignment with the photodetectors 20 along the circumferential direction. This cause the output current to have a cycle proportional to the pitch of the photowindows 16.

The rotational angle detecting device mentioned above is different from conventional devices in that its output current is equal to the sum of the output currents generated by each segment of the photodetector 20, since each segment of the photodetector 20 is connected in parallel to the other segments. As a consequence, the output current 7 of a desired magnitude can be obtained by making the sum of the areas of the segments of the photodetector 20 larger than an appropriate lower limit, for instance 0.1 cm². As a result, according to the present invention, especially large amplification of the output current of the photodetectors is not required, and any additional special circuit to achieve large, stable amplification is not required.

Figure 9:
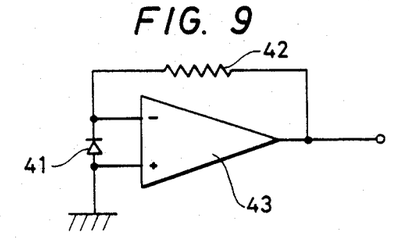
FIG. 9 is a equivalent circuit including the photodetector of FIG. 8.

Devices have been manufactured according to the present invention which included a rotating disk with a diameter of 40 mm and having 800 slitted photowindows of 50 μm width and 1.5 mm length. A stationary photodetecting plate was provided which included 800 segments of transparent electrodes on an amorphous silicon layer with the same radial pattern as the photowindows. The rotating disk and the stationary photodetecting plate were opposed in parallel and separated by a distance of about 1 mm. An output current with a peak value of 6 uA was obtained from the photodetector 41 of FIG. 9, by using a resistance 42 and an operational amplifier 43. In the devices manufactured in this manner, all of the output currents have had the same period and no pulsation has been observed in output currents. This means that fluctuations in the output currents of the photodetectors due to a positioning error between the rotating disk and the stationary photodetecting plate and irregularities in the shapes, sizes, and positions of the photodetectors cancelled each other.

Although not shown in the drawings, the number of the photodetectors 20 may be double, triple, ... n (integer) times the number of photowindows 16. In this case, the photowindows 16 oppose a fraction of n of the photodetectors 20 at the same time. This improves the accuracy of the detected rotational angle by n times without changing the scheme of the photowindows and the magnitude of the output current.

It is preferable that the top surface of the rotating disk 13 be illuminated uniformly by using many light sources 11. However, when this is difficult from a practical viewpoint, at least two light sources 11 are preferably used.

Figure 10:
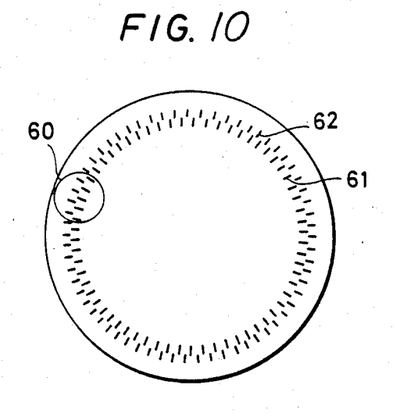
FIG. 10 is a top view of a photodetector according to a second embodiment of the present invention.

FIG. 10 is a top view of a photodetector according to a second embodiment of the present invention. The photodetector is comprised of an inner group of detector segments 61 and an outer group of detector segments 62. The detector segments 61, 62 are arranged to have the same angular pitch on respective coaxial circles. The segments 61, 62 are connected back to back with respect to each other although such connection is not shown in the figure.

Figure 11A:
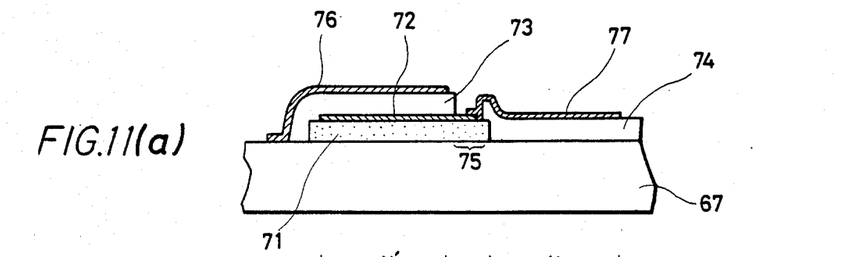
FIGS. 11(a), 11(b), and 11(c) are views of a portion of the photodetector of FIG. 10.

FIG. 11(a) is an enlarged cross-sectional view of the portion 60 of FIG. 10 and shows that an insulating layer of poly-imido 71 of thickness of about 1 μm is applied on a conductive plate 67 such as stainless steel. The layer 71 is then patterned through conventional photoetching processes. A metal electrode 72 is formed on the insulating layer 71 by depositing metal of high melting point such as Ti, Mo, W, etc., in vacuum to a thickness of about 0.1 μm. The metal electrode 72 is also successively patterned through photoetching.

Next, a glow discharge is carried out to deposit amorphous silicon (a-Si) layers 73 and 74. A portion 75 of the metal electrode 72 is covered with a mask and is reserved for an electrical connection. The layers of a-Si 73 and 74 form p-i-n structures as was the case in FIG. 8. The layer of a-Si 73 covers almost all portions of the poly-imido layer 71, and the a-Si layer 74 also covers a portion of the layer 71. An edge of the metal electrode 72 is extended to a middle point of the aSi layers 73 and 74. Transparent electrodes ITO 76 and 77 are formed to have patterns as shown in FIG. 11(a).

The segments 61 of the inner group of photodetectors are connected to the metal electrode 72 through the transparent electrode 77, and the segments 62 of the outer group of photodetectors are connected to the stainless steel plate 67 through the transparent electrode 76. Therefore, as shown in equivalent circuit of FIG. 13, a back-to-back connection is achieved in which the stainless steel plate 67 is a common positive terminal of the inner group of segments 61 and the transparent electrode 77 is a common negative terminal of the inner group of segments 61 and the transparent electrode 76 is a common negative terminal of the outer group of segments 62.

Figure 11B:
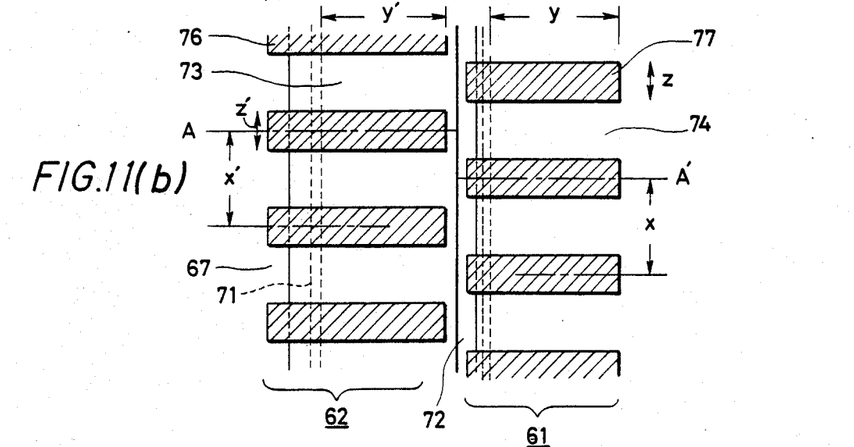

The effective photodetection area of a segment 61 of the inner group of photodetectors as shown in FIG. 11(b), is y x z, which corresponds to the area where the transparent electrode 77 and the plate 67 are separated by only the a-Si layer 74. Here, z is the mean width of the transparent electrode 77.

The effective photodetection area of a segment 62 of outer group of photodetectors as shown in FIG. 11(b), is $y' \times z'$ which corresponds to the area where the transparent electrode 76 and the metal electrode 72 are separated by only the a-Si layer 73. Here $z'$ is the mean width of the transparent electrode 76. A relation $z' > z$ is obtained, since the two groups of photodetector segments 61 and 62 are arranged on two coaxial circumferences. Also, the mean distance x between adjacent segments of the inner group of segments 61 is smaller than the distance $x'$ between adjacent segments of the outer group of segments 62.

Figure 11C:
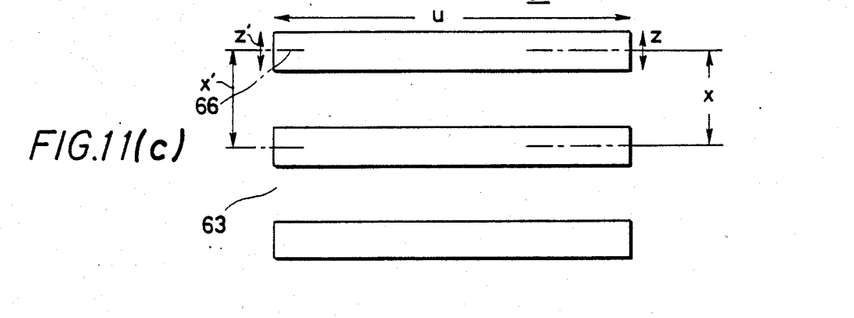

The photowindows 66 of the rotating disk 13 are formed as shown in FIG. 11(c). Each of them has a trapezoidal shape of length u, an inner side width Z, and an outer side width $Z'$, and is separated by an inner side pitch x and an outer side pitch $x'$.

The width $u > y + y'$. The photowindows 66 may also be divided into an inner side portion and an outer side portion.

Figure 12:
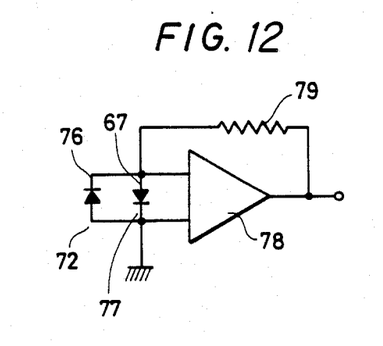
FIG. 12 is an equivalent circuit including the photodetector of FIG. 10.
Figure 13:
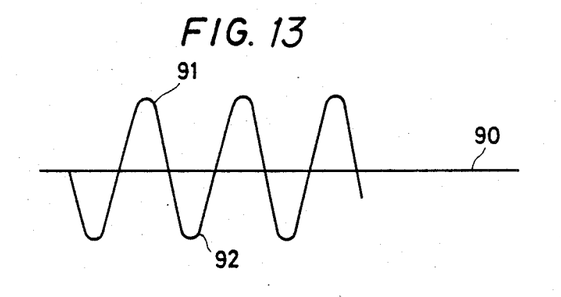
FIG. 13 is a diagram of a waveform produced by the photodetector of FIG. 10.

Under the construction described above, when the photowindows 66 reach just above the segments of the outer group of segments 62 by rotation of the rotating disk 13, an output having the waveform 91 in FIG. 13 is produced. A line 90 in FIG. 13 is a reference level, which is ground in the case of FIG. 12. On the other hand, an output of a curve 92 in FIG. 13 is produced when the photowindows 66 reach just above the segments 61 of the inner group of photodetectors. If $y \times z = y'z'$ and the areas of both groups of photodetectors 61 and 62 are equal, the outputs 91 and 92 are equal in absolute magnitude and opposite in polarity. In the case in which the areas of both groups of the photo-detectors are different, the absolute magnitudes are not equal. The relation of opposite polarity is maintained.

The amplitudes of the outputs 91 and 92 vary with changes in magnitude of light received by the photodetectors due to degradation or instability of light source 11. The characteristic that the output current crosses the reference voltage 90 is not changed, however, causing no change in the phase of pulses detected by a Schmitt trigger circuit having a threshold voltage of ground potential. In this manner, according to the second embodiment of the present invention, detection errors due to the degradation or instability of the light source 11 or of the photodetectors can be effectively avoided.

In a device manufactured according to the second embodiment of the present invention, the magnitude of light emitted from LEDs used as light sources was decreased intentionally by ½ by decreasing the current through the LEDs by ½. No phase shift of the output was observed. On the contrary, in the device shown in FIG. 9, an output having a rectangular shape cannot be obtained in some cases depending on the value of threshold voltage, when the magnitude of light was decreased by ½.

Figure 14A:
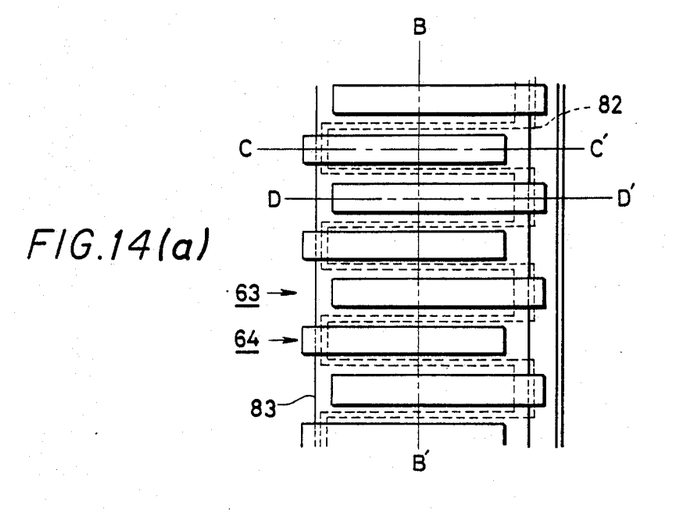
FIGS. 14(a), 14(b), 14(c) and 14(d) are fragmentary cross-sectional views of a photodetector according to a third embodiment of the present invention.
Figure 14B:
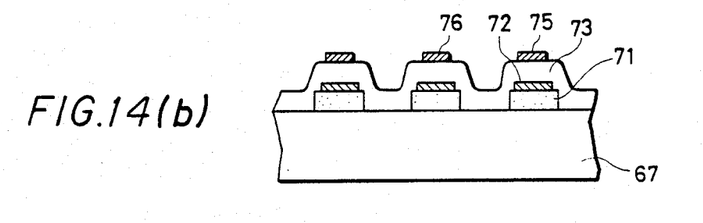
Figure 14C:
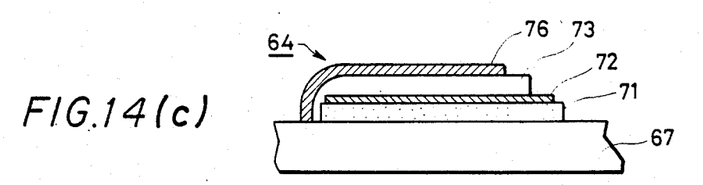
Figure 14D:
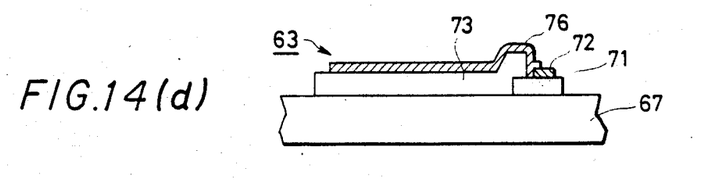

FIG. 14(a) is a top view and FIGS. 14(b)–(d) are partial cross-sectional views of a photodetector according to a third embodiment of the present invention. In the embodiment, a pattern of poly-imido 71 of thickness of about 1 μm is formed on the conductive plate 67, for example a stainless steel plate. The pattern 71 was formed through conventional photoetching processes after the formation of a uniform poly-imido layer on the plate. An electrode 72 of a metal with a high melting point was formed to have a pattern 82 as in FIG. 14(a). The electrode 72 does not electrically contact the plate 67. A P-I-N a-Si layer 73 is formed to have a pattern as shown in FIGS. 14(b)–(d). At this step, the poly-imido layer 71 is covered partially with a metal electrode 72, and the remainder with a-Si layer 73. A transparent electrode 76 of ITO is also formed.

As shown in FIG. 14(d), which is a cross-sectional view taken along the line D-D' of FIG. 14(a), the plate 67 is connected to a positive electrode formed on a p-type layer of a first photodetector segment 63. The same plate 67 is connected through a transparent electrode 76 to a negative electrode formed on a n-type layer of a second photodetector 64, as shown in FIG. 14(c) which is a sectional view taken along line C-C' of FIG. 14(a). Further, a negative electrode of the first photodetector 63 is connected to a positive metal electrode 72 through the transparent electrode 76. In this manner, adjacent first and second photodetectors are connected back-to-back as a pair as shown in FIG. 12. In this case, the photowindows 66 on the rotating disk are formed to have a pitch equal to the pitch of adjacent ones of the photodetectors 63 and 64, to illuminate the photodetectors 63 and 64 one after the other. The remainder of the device is constructed the same as the second embodiment.

In both the second and the third embodiments, a higher yield can be achieved even with the same positioning error of the mask used for patterning the transparent electrode since a continuous a-Si layer exists between the patterns of the first and the second photodetectors. Also, no problems arise even if there is a difference between the effective areas of the first and the second photodetectors.

In the second and third embodiments of the present invention, the first and the second photodetectors are arranged interdigitally, i.e., alternately, along the circumferential direction. Another scheme may be used, however, in which the first and the second photodetectors are arranged on the same radial lines, while photowindows are separated into two groups each interdigitally arranged along a circumferential direction to illuminate the first and the second photodetectors one after the other. Also, the photodetectors may be arranged on only a part of the circumference or, on the contrary, the photowindows may be arranged on only a part of the circumference in the case when the photodetectors are arranged on the whole circumference.

While the salient features of the present invention have been described with reference to the drawings, it should be understood that the preferred embodiments described herein are susceptible of modifications and alterations without departing from the spirit and scope of the following claims.

What is claimed is:

1. A rotational angle detecting device comprising:
   a rotatable plate adapted to be attached to a rotatable shaft of a rotor for rotation therewith, the rotating plate having a plurality of windows arranged at a first angular pitch on the entire circumference around the axis of the rotor;
   a light source for simultaneously uniformly illuminating all of said windows on said rotating plate; and
   a stationary detection plate opposed in a parallel to said rotating plate and having a plurality of photodetectors for receiving light from said light source passing through said windows and for generating output signals having amplitudes corresponding to the intensity of said received light, said photodetectors being arranged to have a second angular pitch on said circumference, at least two of said photodetectors being connected in parallel to generate a combined output signal having a magnitude corresponding to the sum of the output signals thereof.

2. A rotational angle detecting device according to claim 1 wherein said light source comprises:
   at least two light emitting diodes;
   a light reflector arranged to reflect light from said diodes toward said windows; and
   a light diffusing plate for diffusing said reflected light.

3. A rotational angle detecting device according to claim 1 wherein all of said photodetectors are electrically connected in parallel.

4. A rotational angle detecting device according to claim 1 wherein said windows are provided completely around said circumference at said first angular pitch.

5. A rotational angle detecting device according to claim 1 wherein said photodetectors are provided completely around said circumference at said second angular pitch.

6. A rotational angle detecting device comprising:
   a rotational plate adapted to be attached to a rotatable shaft of a rotor for rotation therewith, the rotating plate having a plurality of windows arranged at a first angular pitch on the entire circumference around the axis of the rotor;
   a light source for simultaneously illuminating at least two of said windows on said rotating plate;
   a stationary detection plate opposed in parallel to said rotating plate having a plurality of first photodetectors arranged on said circumference at a second angular pitch and a plurality of second photodetectors arranged on said circumference at said second angular pitch, said first and second plurality of photodetectors being alternately provided on said circumference, each of said first and second plurality of photodetectors for receiving light from said light source passing through said windows and for generating output signals having amplitudes corresponding to the intensity of said received light, said output signals produced by said first plurality of photodetectors being opposite in polarity to said output signals produced by said second plurality of photodetectors and shifted in phase by an amount corresponding to predetermined fraction of said second pitch; and means for interconnecting adjacent first and second photodetectors to produce a combined output signal corresponding to the sum of said output signals of said interconnected adjacent first and second photodetectors.

7. A rotational angle detecting device according to claim 6 further including:
a first electrode for electrically connecting at least two of said first plurality of photodetectors in parallel; and
a second electrode for electrically connecting at least two of said second plurality of photodetectors in parallel.

8. A rotational angle detecting device according to claim 7 wherein said second plurality of photodetectors are formed on a second circumference different from said first circumference.

9. A rotational angle detecting device according to claim 6 wherein said second pitch is equal to said first pitch.

10. A rotational angle detecting device according to claim 6 wherein said first and second plurality of photodetectors are formed along only a portion of said circumference.

11. A rotational angle detecting device according to claim 1 wherein said second pitch is equal to said first pitch.

12. A rotational angle detecting device according to claim 1 wherein said second pitch is a fraction of said first pitch.

13. A rotational angle detecting device according to claim 6 wherein said second pitch is a fraction of said first pitch.

14. A rotational angle detecting device comprising:
a rotational plate adapted to be attached to a rotatable shaft of a rotor for rotation therewith, the rotating plate having a plurality of windows arranged at a first angular pitch on the entire circumference around the axis of the rotor;
a light source for simultaneously illuminating at least two of said windows on said rotating plate;
a stationary detection plate opposed in parallel to said rotating plate having a plurality of first photodetectors arranged on a first circumference at a second angular pitch and a plurality of second photodetectors arranged on a second circumference at said second angular pitch, said first and second plurality of photodetectors being alternately provided on said first and second circumferences, respectively, each of said first and second photodetectors for receiving light has said light source passing through said windows and for generating output signals having amplitudes corresponding to the intensity of said received light, said output signals produced by said first plurality of photodetectors being opposite in polarity to said output signals produced by said second plurality of photodetectors and shifted in phase by an amount corresponding to predetermined fraction of said second pitch; and
means for interconnecting adjacent first and second photodetectors to produce a combined output signal corresponding to the sum of said output signals of said interconnected adjacent first and second photodetectors.

* * * * *